(12) United States Patent
Anderson

(10) Patent No.: US 8,400,112 B2
(45) Date of Patent: Mar. 19, 2013

(54) METHOD FOR MANAGING POWER LIMITS FOR A BATTERY

(75) Inventor: Richard Dyche Anderson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 12/943,429

(22) Filed: Nov. 10, 2010

(65) Prior Publication Data

US 2011/0140668 A1    Jun. 16, 2011

(51) Int. Cl.
    *H02J 7/00* (2006.01)
(52) U.S. Cl. ........................ 320/134; 320/132
(58) Field of Classification Search .............. 320/134
    See application file for complete search history.

(56) References Cited

U.S. PATENT DOCUMENTS

| | | | |
|---|---|---|---|
| 5,842,534 A | 12/1998 | Frank | |
| 6,011,380 A * | 1/2000 | Paryani et al. | 320/132 |
| 6,054,844 A | 4/2000 | Frank | |
| 6,116,363 A | 9/2000 | Frank | |
| 6,314,346 B1 * | 11/2001 | Kitajima et al. | 701/22 |
| 6,646,419 B1 | 11/2003 | Ying | |
| 6,816,759 B2 | 11/2004 | Kimura | |
| 7,447,601 B2 * | 11/2008 | Lhermite et al. | 702/60 |
| 7,472,769 B2 | 1/2009 | Yamanaka et al. | |
| 7,570,021 B2 * | 8/2009 | Togashi et al. | 320/130 |
| 7,730,333 B2 * | 6/2010 | Berkes et al. | 713/300 |
| 7,802,120 B2 * | 9/2010 | Conroy et al. | 713/340 |
| 7,941,675 B2 * | 5/2011 | Burr et al. | 713/300 |
| 2005/0040789 A1 * | 2/2005 | Salasoo et al. | 320/119 |
| 2006/0100057 A1 * | 5/2006 | Severinsky et al. | 477/4 |
| 2006/0139004 A1 * | 6/2006 | Uesugi et al. | 320/132 |
| 2007/0102207 A1 | 5/2007 | Yamanaka et al. | |
| 2007/0233334 A1 | 10/2007 | Kozarekar | |
| 2007/0272456 A1 | 11/2007 | Shiiba | |
| 2009/0118079 A1 * | 5/2009 | Heap et al. | 477/3 |
| 2009/0266631 A1 | 10/2009 | Kikuchi | |
| 2009/0306915 A1 | 12/2009 | Schoch | |
| 2010/0000809 A1 | 1/2010 | Nishi et al. | |

FOREIGN PATENT DOCUMENTS

| | | |
|---|---|---|
| EP | 1754977 A2 | 2/2007 |
| EP | 1911650 A1 | 4/2008 |
| JP | 2007246050 A | 9/2007 |
| JP | 2009166513 A | 7/2009 |
| WO | 2009069637 A1 | 6/2009 |

OTHER PUBLICATIONS

Kandler Smith and Chao-Yang Wang, Pulse Discharge Power Availability of a Lithium-Ion Hybrid Vehicle Battery Pack, SAE International, www.sae.org, Document No. 2005-01-3464, Sep. 2005, 1 pg.
Joonyoung Park, Youngkug Park, and Jahng-Hyon Park, Real-Time Powertrain Control Strategy for Series-Parallel Hybrid Electric Vehicles, SAE International, www.sae.org, Document No. 2007-01-3472, Aug. 2007, 1 pg.

* cited by examiner

*Primary Examiner* — Arun Williams
(74) *Attorney, Agent, or Firm* — David B. Kelley; Brooks Kushman P.C.

(57) ABSTRACT

A method for managing power limits for a battery includes the step of increasing a minimum operating state of charge after an initial power capability has decreased to the point where a predefined full discharge power is not available at an initial minimum operating state of charge. The increased minimum operating state of charge can be chosen such that the full discharge power is available. The increased minimum state of charge may not be chosen to provide the full discharge power if the increased minimum state of charge is greater than a maximum low limit state of charge.

19 Claims, 7 Drawing Sheets ical Field

The present invention relates to a method for managing power limits for a battery.

2. Background

A battery used in an electric vehicle or hybrid electric vehicle (HEV), like any battery, has a finite life. Specifically, the power capability of a battery decreases as the battery ages. HEV batteries are often controlled such that they operate at or near a 50% state of charge (S.O.C.), with a full battery power being available over some range of states of charge. For example, a battery in an HEV may be controlled such that the S.O.C. is in the range of 40%-60%. When a battery operates outside its desired S.O.C. range, the power limit will be reduced so that the battery is not asked to exceed its capability on either the charge or discharge side.

As a battery ages, its power capability decreases, and the power limits must be accordingly reduced both inside and outside the desired S.O.C. operating range. Because the power limits can be represented by a curve, one way to reduce the power limits is to reduce the entire curve by some power value to ensure that the entire curve remains under the power capability curve at every S.O.C. This method may have the disadvantage of significantly reducing the power limits over the entire S.O.C. operating range, when in fact, it may be possible to have a higher power limit over at least some of the S.O.C. operating range.

Therefore, it would be desirable to have a control strategy for managing battery power limits such that higher power limits are made available even after a battery ages and its power capability is reduced.

SUMMARY

Embodiments of the present invention include a method for managing power limits for a battery having a power capability that is a function of at least the battery S.O.C. The battery has an operating S.O.C. range defined by a minimum operating S.O.C. and a maximum operating S.O.C. It also has a discharge power limit that is a function of at least the S.O.C. An initial discharge power limit is set below an initial power capability such that a predefined full discharge power is available at states of charge above an initial minimum operating S.O.C. The method includes determining whether the full discharge power is available at the initial minimum operating S.O.C. after the initial power capability has decreased. A new S.O.C. at which the battery can supply the full discharge power is determined when it is determined that the full discharge power is not available at the initial minimum operating S.O.C. It is then determined whether the new S.O.C. is greater than a maximum low limit S.O.C., and the minimum operating S.O.C. is set to the new S.O.C. if it is determined that the new S.O.C. is not greater than the maximum low limit S.O.C.

Embodiments of the invention also include a method for managing power limits for a battery that includes increasing a minimum operating S.O.C. after an initial power capability has decreased such that a predefined full discharge power is not available at an initial minimum operating S.O.C. The increased minimum operating S.O.C. is chosen such that the full discharge power is available if the increased minimum S.O.C. is not greater than a maximum low limit S.O.C. Conversely, if the S.O.C. where full discharge power is available is greater than the maximum low limit S.O.C., and a power capability of the battery at the maximum low limit S.O.C. is not less than a predetermined power capability, then the increased minimum operating S.O.C. is set to the maximum low limit S.O.C. The predetermined power capability can be defined as being equal to an operational minimum power capability plus a predetermined amount, such as a small buffer. In the case of an HEV, the operational minimum power capability may be defined as the amount of power required to start the engine.

The method may also include setting the increased minimum operating S.O.C. to the maximum low limit S.O.C. if the S.O.C. where full discharge power is available is greater than the maximum low limit S.O.C., and a temperature of the battery is not within a predetermined range. An end of life for the battery may be indicated if the S.O.C. where full discharge power is available is greater than the maximum low limit S.O.C., the power capability at the maximum low limit S.O.C. is less than a predetermined power capability, and the temperature of the battery is within the predetermined temperature range. The maximum low limit S.O.C. allowed during a fault condition of the battery may be defined as a "default condition maximum low limit S.O.C.". Similarly, an absolute maximum low limit S.O.C. may be defined as the S.O.C. at which the battery can supply a minimum operational discharge power. A method of the present invention may also include the step of setting the maximum low limit S.O.C. to the absolute maximum low limit S.O.C. if the absolute low limit S.O.C. is not greater than the default condition maximum low limit S.O.C.

Embodiments of the invention also include a method for managing power limits for a battery that includes reducing a maximum operating S.O.C. after an initial power capability has decreased, such that a predefined full charge power is not available at an initial maximum operating S.O.C. The reduced maximum operating S.O.C. is chosen such that the full charge power is available if the reduced maximum S.O.C. is not less than a minimum high limit S.O.C. Conversely, the reduced maximum operating S.O.C. is set to the minimum high limit S.O.C. if it is determined that the reduced maximum operating S.O.C. is less than the minimum high limit S.O.C.

Embodiments of the invention include a method for managing power limits for a battery, including the steps of determining whether the full discharge power is available at the initial minimum operating S.O.C. after the initial power capability has decreased. The discharge power limit is reduced at a first predetermined S.O.C. to a first point below a present power capability curve. A first portion of a discharge power limit curve is defined as containing the first point and being generally parallel to the present power capability curve. A second portion of the discharge power limit curve is defined as having a generally constant power level above a second predetermined S.O.C.

The first predetermined S.O.C. may be, for example, the initial minimum operating S.O.C. The second predetermined S.O.C. may be, for example, the present S.O.C. of the battery. Alternatively, the second predetermined S.O.C. could be defined as the point at which the first portion of the discharge power limit curve intersects the initial discharge power limit curve at a point above the initial minimum operating S.O.C. The discharge power limit curve may also have a third portion defined as being coincident with a portion of the initial discharge power limit curve below the initial minimum operating S.O.C.

Embodiments of the invention may also include a method for managing power limits for a battery that include the steps of reducing a discharge power limit curve for the battery after a present power capability curve has lowered such that a predefined full discharge power is not available at an initial minimum operating S.O.C. The reduced discharge power limit curve has a first portion that is generally parallel to the present power capability curve, and a second portion that is generally horizontal above a predetermined S.O.C. The second portion of the reduced discharge power limit curve may begin at the present S.O.C., or alternatively, may begin at the point of intersection between the reduced discharge power limit curve and the initial discharge power limit curve above the initial minimum operating S.O.C. The reduced discharge power limit curve may include a third portion that is coincident to an initial discharge power limit curve below the initial minimum operating S.O.C.

DETAILED DESCRIPTION

Figure 1:
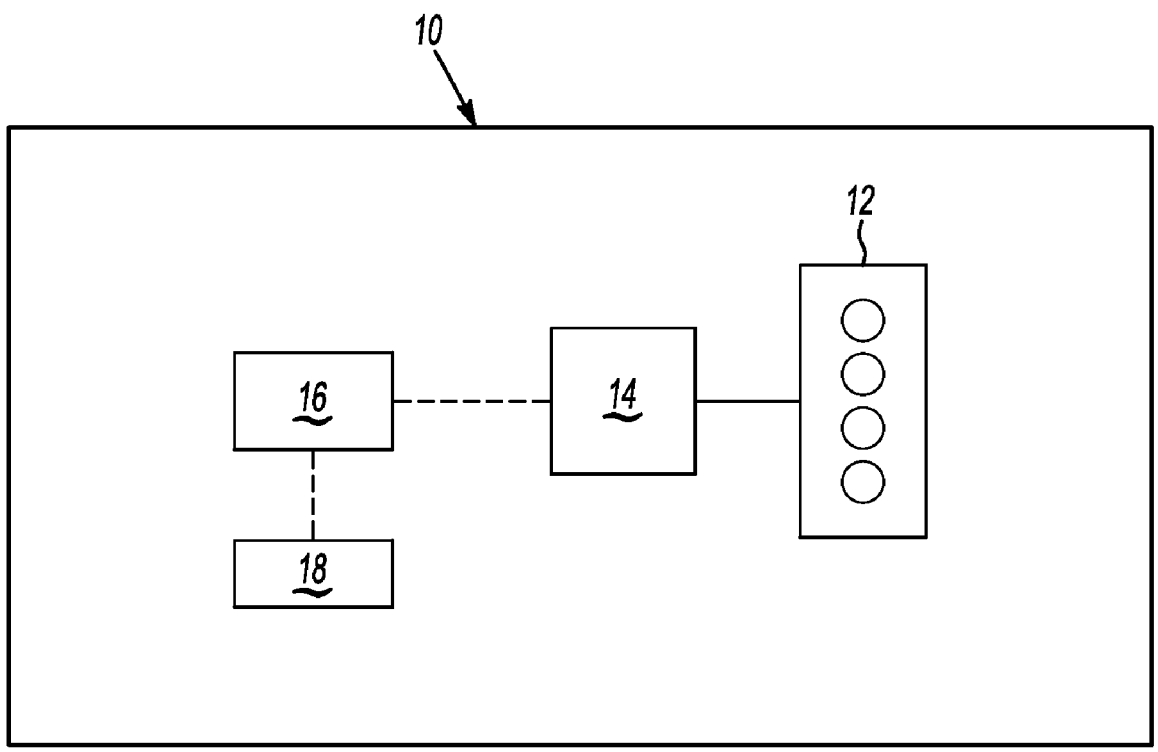
FIG. 1 is a schematic representation of an HEV containing a battery controlled in accordance with embodiments of the present invention.

FIG. 1 illustrates a vehicle 10 having an engine 12, an electric motor 14, a battery 16, and a battery control module (BCM) 18. Although the vehicle 10 is an HEV, it is understood that battery control methods in accordance with the present invention can be used to control batteries that power other types of systems and equipment, for example, electric vehicles having no engine, fuel cell electric vehicles, etc. As described in detail below, embodiments of the present invention include methods for managing power limits for a battery, such as the battery 14. These methods may be part of a control strategy programmed into one or more controllers, such as the BCM 18. It is understood that the BCM may be part of a larger controller area network (CAN) that includes a vehicle system controller (VSC), a powertrain control module (PCM), and one or more controllers dedicated to a particular piece of equipment, like the BCM 18.

Figure 2:
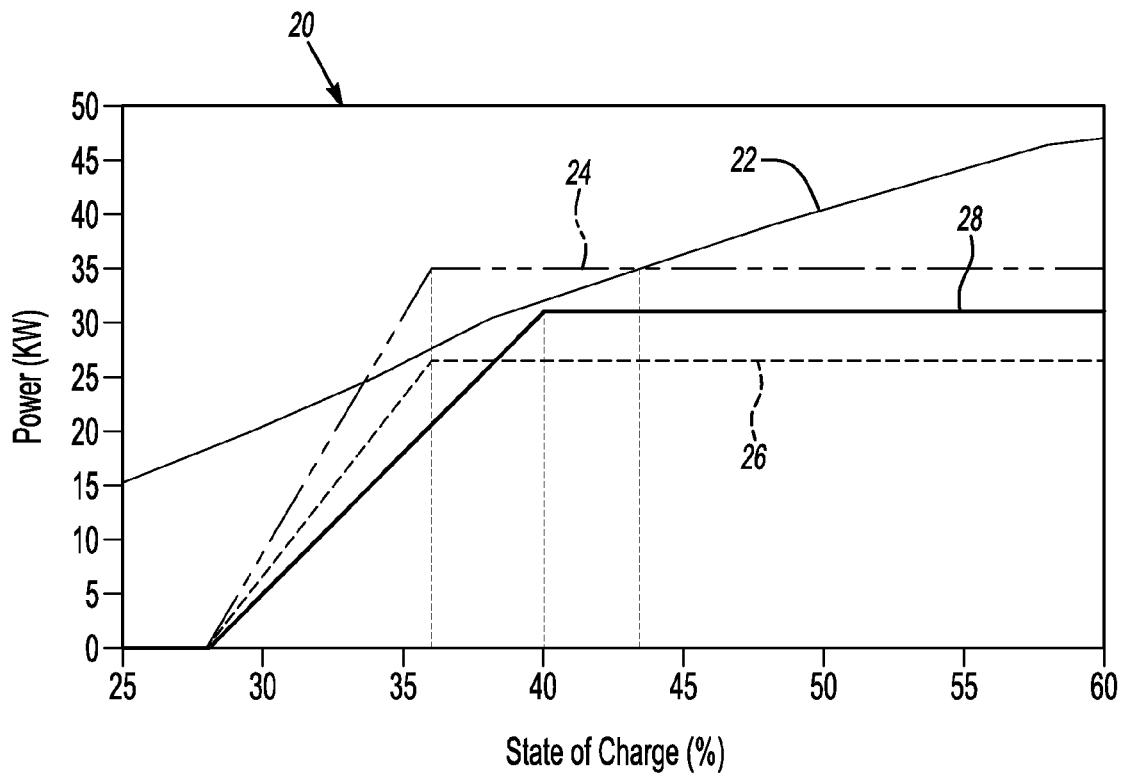
FIG. 2 is a graph showing a battery discharge power limit managed in accordance with an embodiment of the present invention.

FIG. 2 shows a graph 20 illustrating the power capability 22 of a battery, such as the battery 14 shown in FIG. 1. The graph 20 illustrates the discharge power side of a battery whose power capability 22 is reduced from an initial power capability the battery had when it was new. An initial discharge power limit, shown by the curve 24 is above the power capability curve 22 for certain states of charge. An initial power capability of the battery may have had a curve similar in shape to the curve 22; however, it would have been above the power discharge limit curve 24 for all states of charge.

In general, a discharge power limit, or on the other side of the curve a charge power limit, is chosen to be somewhere below the power capability of the battery at the time the power limits are set. It can be based on a number of factors, including the needs of the system being operated by the battery, in the case of the vehicle 10 shown in FIG. 1, the power requirements of the motor 14 needed to start the engine 12 and/or propel the vehicle 10, and may also be dependent on the physical constraints of the battery itself. As shown in FIG. 2, the discharge power limit 24 is generally constant at 35 kilowatts (kW) above an S.O.C. of 36%. As noted above, the initial power capability of the battery was above the initial discharge power curve 24 for all states of charge. Thus, when the battery was new, the highest portion of the curve 24, which is at 35 kW, represented the full discharge power for the battery. The full discharge power was available starting at an S.O.C. of about 36%, which represents a minimum operating S.O.C. for the battery. As shown in FIG. 2, the power capability 22 of the battery is below the initial discharge power limit 24 at the minimum operating S.O.C. of 36%. As a result, it is necessary to reduce the discharge power limit for the battery so that it is once again below the power capability 22.

One way to reduce the discharge power limit so that it is below the power capability 22 is to reduce the power discharge limit curve 24 over the S.O.C. operating range by some predetermined amount—this is illustrated by the curve 26. Reducing the discharge power limit in this way does ensure that the discharge power limit 26 is below the power capability 22 at the initial minimum operating S.O.C. of 36%; however, it undesirably keeps the discharge power limit lower than it needs to be over much of the S.O.C. operating range. This is where the control strategy of the present invention can be employed to more efficiently utilize battery power.

Embodiments of the present invention examine the battery power capability at the initial minimum operating S.O.C. after the battery capability has been reduced from its initial state. Using FIG. 2 for reference, a method of the present invention would determine whether the full discharge power of 35 kW is available at the initial minimum operating S.O.C. of 36% after the initial power capability of the battery has decreased. As illustrated in FIG. 2, the reduced power capability 22 of the battery provides only about 27.5 kW discharge power at an S.O.C. of 36%. Rather than reducing the discharge power limit curve 24, such as illustrated by the reduced curve 26, embodiments of the present invention determine a new S.O.C. at which the battery can supply the full discharge power of 35 kW even given the reduced power capability curve 22. As shown in FIG. 2, this new S.O.C. is a little under 44%.

Because it is not desirable to have the minimum operating S.O.C. to be too great, it may be desirable to provide a maximum low limit S.O.C. to be the upper boundary of the minimum operating S.O.C. Again using FIG. 2 for reference, if the maximum low limit S.O.C. was above the new S.O.C. of approximately 44%, then the minimum operating S.O.C. would be changed from its initial value of 36% to the new S.O.C. of approximately 44%. If, however, the maximum low limit S.O.C. was below 44%, embodiments of the present invention would not set the minimum operating S.O.C. at this level.

In the example shown in FIG. 2, the maximum low limit S.O.C. is 40%; therefore, even though the full discharge power is not available until after an S.O.C. of 44%, the minimum operating S.O.C. will be changed from 36% only to 40%. As will be discussed in detail below, the discharge power limits are often changed along with the charge power limits and the combination of these changes can lead to a narrowing in the S.O.C. operating range. Because it is undesirable to have too small of an operating range, the minimum operating S.O.C. will not be increased beyond the maximum low limit S.O.C.

Thus, the curve 28 shown in FIG. 2 represents the new discharge power limit set in accordance with an embodiment of the present invention. Although the maximum discharge power is less than the full discharge power of 35 kW that was available with the new battery, it is well above the maximum discharge power of 27 kW that would have been set using the basic offset method shown by the curve 26. It is worth noting that if the power capability 22, at the maximum low limit S.O.C. of 40%, was below some predetermined power capability, the battery may have been marked as end of life. This is described in more detail below. In the example shown in FIG. 2, however, the power capability 22 of the battery was not so low as to require end of life, and a new discharge power limit curve 28 could be implemented so as to continue to use the battery at the relatively high level of 31 kW over the new S.O.C. operating range.

Because the temperature of the battery can also have an effect on its charge and discharge power capability, embodiments of the present invention may also make a determination of whether a temperature of the battery is within a predetermined range. If it is not within the predetermined range, but the power capability of the battery is below the predetermined power capability, the battery may not be marked for end of life because the low battery power capability may be only a temporary result of the out of range temperature. In such a case, the minimum operating S.O.C. will still be moved to the maximum low limit S.O.C., which is 40% in the example shown in FIG. 2.

Figure 3:
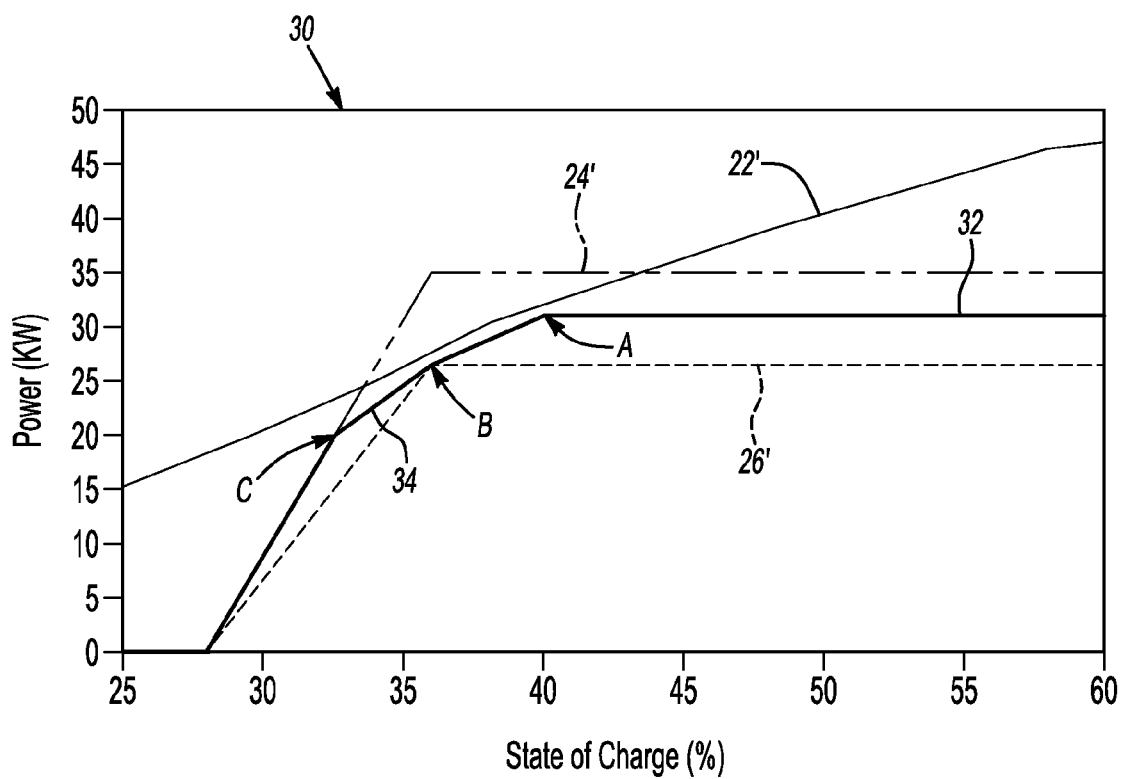
FIG. 3 is a graph showing a battery discharge power limit managed in accordance with an embodiment of the present invention.

As shown in FIG. 2, the discharge power limit curve 28 slopes down to zero as it goes below the maximum low limit S.O.C. of 40%. Although the curve 28 and the power capability curve 22 are very close at an S.O.C. of 40%, the two curves quickly diverge below 40% such that power that might otherwise be available to a vehicle operator is artificially limited by the slope of the discharge power limit curve 28. Embodiments of the present invention address this issue, and this is illustrated in the graph 30 shown in FIG. 3. In FIG. 3, the curves 22', 24', 26' are all analogous to the curves 22, 24, 26 shown in FIG. 2. The curve 32, however, is different from the curve 28 once the S.O.C. drops below 40%. Above 40%, the curve 32 is, like the curve 28 shown in FIG. 2, constant at 31 kW. Below an S.O.C. of 40%, however, the curve 32 does not slope directly to zero as the curve 28 does in FIG. 2. Rather, the curve 32 more closely resembles the slope of the curve 22', thereby maintaining additional power availability for a vehicle operator at lower states of charge.

One way to determine the slope of the curve 32 below an S.O.C. of 40% is to define a first point A as the discharge power limit at the minimum operating S.O.C. of 40%. Next, a second point is defined at the initial minimum operating S.O.C. (recalling from FIG. 2 this value is 36%), where the second point is some distance below the power capability. This is illustrated as point B in FIG. 3. A first portion of the discharge power limit curve 32 below the minimum operating S.O.C. of 40% is then defined by the line connecting point A and point B. A second portion of the discharge power limit curve 32 below the minimum operating S.O.C. of 40% can then be defined by a line segment 34 that has a slope that generally matches the slope of the power capability curve 22' and also contains the point B. After point C, the slope of the discharge power limit 32 is run to zero, in this case along the same line as the initial discharge power limit 24'.

The discussion above can be represented in equation form as follows:

$$DPL_{raw} = DPL_a - (DPL_a - DPL_b) \cdot \frac{(SOC - SOC_a)}{(SOC_a - SOC_b)}$$

where:
SOCa and DPLa are the S.O.C. and discharge power limit (capability less any desired buffer) at Point A,
SOCb and DPLb are the S.O.C. and discharge power limit (capability less any desired buffer) at Point B, and
SOC is the actual state of charge of the battery.

A similar equation can be used for management of a charge power limit, such as the charge power limit discussed below in conjunction with FIG. 5. For example:

$$CPL_{raw} = CPL_a - (CPL_a - CPL_b) \cdot \frac{(SOC_a - SOC)}{(SOC_a - SOC_b)}$$

where:
SOCa and CPLa are the S.O.C. and charge power limit (capability less any desired buffer) at Point A,
SOCb and CPLb are the S.O.C. and charge power limit (capability less any desired buffer) at Point B, and
SOC is the actual state of charge of the battery.

Figure 4:
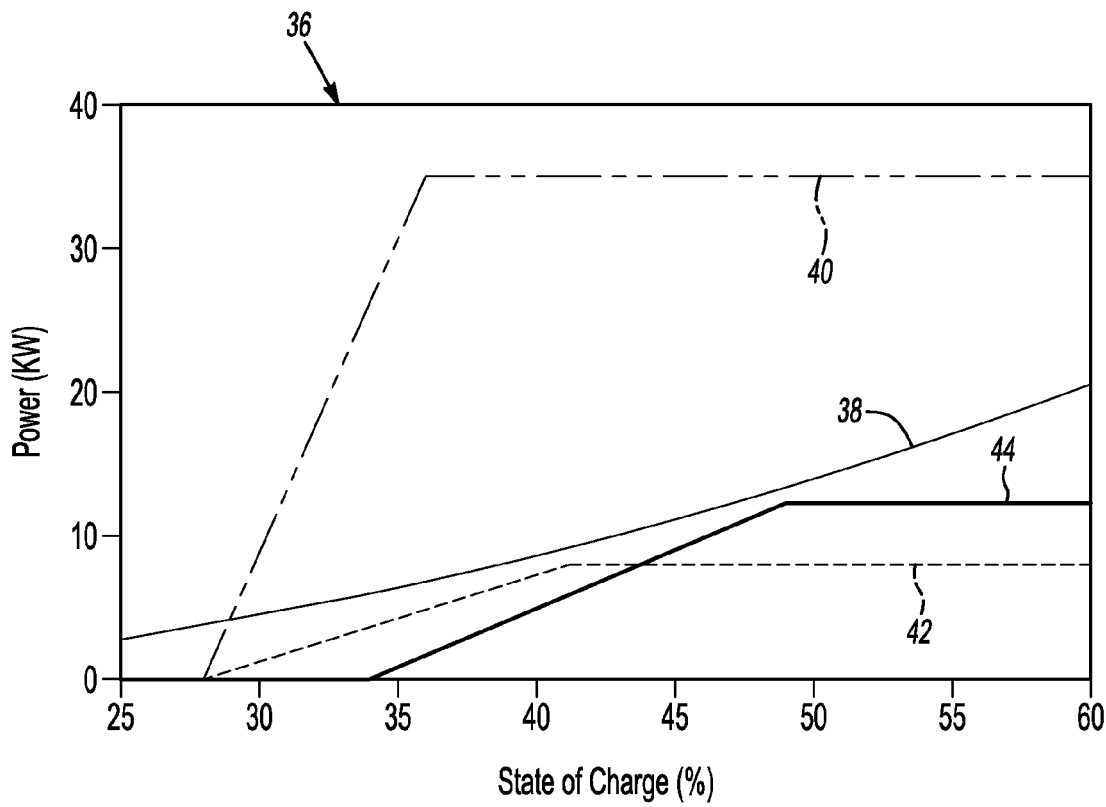
FIG. 4 is a graph showing a battery discharge power limit for a battery nearing its end of life managed in accordance with an embodiment of the present invention.

FIG. 4 shows a graph 36 showing the power capability 38 of a battery nearing end of life. The curve 40 represents the initial discharge power limit set when the battery was new. As clearly shown in FIG. 4, the power capability 38 is now well below the initial discharge power limit 40, which itself was set below the initial power capability of the battery. As noted above, when the power capability of a battery is reduced, the power discharge limits are also reduced to ensure that the demand on the battery does not exceed its capability. One way to do this would be to set the discharge power limit in accordance with the curve 42, which provides a minimum operating S.O.C. at or near the maximum low limit S.O.C. of 40%. Although this keeps the discharge power limit below the power capability 38, it unnecessarily limits the amount of power available to the vehicle operator because of the limitation on the maximum low limit S.O.C. of 40%. To address this issue, embodiments of the present invention allow the minimum operating S.O.C. to go beyond the maximum low limit S.O.C. when the battery is near end of life.

A control strategy in accordance with the present invention, may, for example, set the battery discharge power limit for a near end of life battery in accordance with the curve 44 shown in FIG. 4. In this case, the minimum operating S.O.C. is approximately 49%, which is well above the maximum low limit S.O.C. of 40% discussed above. This exception is made, however, because the battery is near its end of life, and increasing the discharge power limit will allow the battery to be used for a longer time without being marked as end of life. As discussed above, embodiments of the present invention may determine whether a reduced power capability of the battery is below some predetermined power capability. This predetermined power capability may be a minimum operational power capability plus some small amount such as a buffer. When it is determined that the power capability of the battery has dropped below this level, the end of life strategy can be implemented. For example, until this time the minimum operating S.O.C. may be limited to the maximum low limit S.O.C. In the examples used above this was 40%. Upon determination that the power capability of the battery has dropped below the predetermined power capability, the minimum operating S.O.C. may be raised above this level.

In general, the minimum operating S.O.C. will be raised to a point where the battery has the desired power. In the case of an HEV, the desired power will be enough to start the vehicle engine so as to not strand the vehicle operator. The minimum operating S.O.C. will not, however, be set so high that the battery will be overcharged if it is to accept some minimum level of charge, for example, through regenerative breaking. One formula by which the new increased minimum operating S.O.C. can be determined is to take the amount of power that the battery needs to accept for regenerative breaking and then determine the S.O.C. at which this power could be accepted.

In one example, the battery may be required to accept 5 kW of power for regenerative breaking, and it could accept this amount of power when the S.O.C. is at 90%. In addition to this criteria, two other parameters may be evaluated. First, an S.O.C. imbalance in the battery may be determined to account for S.O.C. variations in the individual cells making up the battery. In addition, some minimum operating S.O.C. range will still need to be maintained. Continuing with the example started above, if the S.O.C. imbalance in the battery is 5% and the minimum allowable size of the S.O.C. operating range is 5%, then embodiments of the present invention subtract from the predetermined 90% both the 5% S.O.C. imbalance and the 5% minimum allowable size of the S.O.C. operating range to get a result of 80% S.O.C. This 80% S.O.C. then represents the highest level to which the minimum operating S.O.C. can be raised when the power capability of the battery has fallen below the predetermined power capability amount.

Although the examples thus far have focused on managing the discharge power limit for a battery, similar techniques can be employed with regard to a charge power limit on the high side of the S.O.C. for the battery. In FIG. 5 is a graph 46 showing the application of an embodiment of the present invention to a charge power limit for a battery. The curve 48 shows the power capability for the battery after it has been reduced from some initial power capability. The curve 50 shows the initial power limit which is now above the power capability 48 for certain ranges of the S.O.C. When the initial charge power limit 50 was determined, a full charge power was set at 35 kW. The highest S.O.C. at which the full charge power was available was 64%; after the S.O.C. of 64%, the initial charge power limit 50 is reduced to zero.

One way to manage charge power limits for a battery after the power capability of the battery has degraded, is to reduce the initial charge power limit by some predetermined amount. This is illustrated by the curve 52, where the maximum operating S.O.C. is still set at 64%. As shown in the graph 46, the power level of the curve 52 is just below the power capability 48 at an S.O.C. of 64%. Thus, the amount of power available to a vehicle operator has been reduced from the full charge power of 35 kW to a level of just over 26 kW.

Application of the present invention to the charge power management provides an increase in available power to the vehicle operator over a wide range of S.O.C.; this is shown by the curve 54. Just as with the management of the discharge power limit, a method of the present invention may start by determining an S.O.C. at which the full charge power of 35 kW is available even with the reduced power capability indicated by the curve 48. As shown in FIG. 5, this S.O.C. is just under 57%. Thus, if the maximum operating S.O.C. were reduced to 57%, the full charge power of 35 kW would be available to the vehicle operator at S.O.C.'s below 57%. Just as the minimum operating S.O.C. was limited by some maximum low limit S.O.C., so too is the maximum operating S.O.C. limited by some minimum high limit S.O.C., which may be conveniently referred to as the "minimum high limit S.O.C.". In general, as the minimum operating S.O.C. is increased to provide full discharge power, and the maximum operating S.O.C. is decreased to provide full charge power, the operating range of the S.O.C. is decreased.

Figure 5:
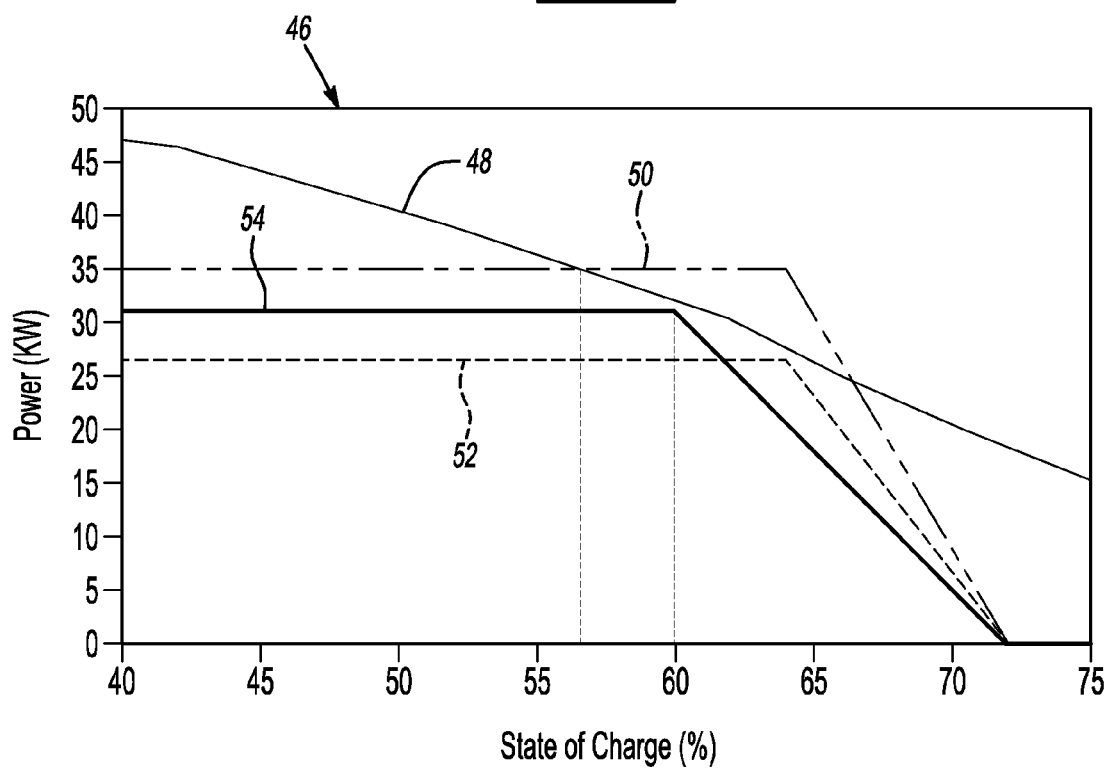
FIG. 5 is a graph showing a battery charge power limit managed in accordance with an embodiment of the present invention.

In the example shown in FIG. 5, the minimum high limit S.O.C. has been set at 60%. Thus, when it is determined that the full charge power of 35 kW is available only if the maximum operating S.O.C. is reduced to 57%, the control strategy of the present invention sets a lower boundary for the maximum operating S.O.C. at 60%. This is illustrated by the curve 54, which is just below the power capability 48 at an S.O.C. of 60%. Although this management strategy results in the lowering of the charge power available to the operator from a full charge power of 35 kW to a charge power of approximately 31 kW, it provides a significant advantage over the method illustrated by curve 52, which would provide a maximum charge power for the vehicle operator of only 26 kW. In addition, there may be many times in which the battery power capability has been reduced, and the reduction in maximum operating S.O.C. to provide full charge power will still be higher than the minimum high limit S.O.C., which means that the vehicle operator will still have the full charge power available, although the S.O.C. operating range will be somewhat reduced.

Turning now to FIGS. 6-9, methods in accordance with embodiments of the present invention are illustrated and described in a number of flow charts. The flow chart 56, shown in FIG. 6, starts with step 58 where the discharge power capability of the battery is determined. At decision block 60, it is determined whether the discharge power capability at the minimum operating S.O.C. is less than the discharge power limit. Turning to FIG. 2, for example, step 60 determines whether the curve 22 is lower than the curve 24 at an S.O.C. of 36%. If the answer was "no", the method moves to step 62, where the discharge power limit 24 and the minimum operating S.O.C. of 36% is left unchanged.

This is not the case, however, in the example shown in FIG. 2. Rather, the curve 22 is below the curve 24 at an S.O.C. of 36%. Therefore, the method moves to step 64, where it is determined the S.O.C. at which the battery can supply the existing full discharge power—this point is approximately 44% on the graph 20 shown in FIG. 2. The next inquiry at step 66 is whether this determined value of S.O.C. is greater than the maximum low limit S.O.C. If it is not, the method moves to step 68 where the minimum operating S.O.C. is set to the S.O.C. determined at step 64. In the example shown in FIG. 2, however, this is not the case, and the determined S.O.C. of approximately 44% is greater than the maximum low limit S.O.C. of 40%. In this case, the method moves to step 70 where two inquiries are made.

The first inquiry made in step 70 is whether the power capability of the battery at the maximum low limit S.O.C. (40% in the example shown in FIG. 2) is less than some operational minimum plus a small buffer amount. The second inquiry is whether the temperature of the battery is within some predetermined range. If the answer to either of these inquiries is "no" the method moves to step 72 where the minimum operating S.O.C. is set to the maximum low limit S.O.C.—this is the situation shown in FIG. 2. The temperature of the battery is analyzed, because a battery outside its normal operating range may have a temporarily reduced power capability that would return to within normal limits when the temperature of the battery returned to the normal operating range.

If the answer to both of the inquiries at step 70 is "yes", an end of life is signalled for the battery—see step 74. A determination is then made as to the S.O.C. at which the battery can supply the minimum operational discharge power—see step 76. At step 78, the inquiry is made as to whether the S.O.C. determined in step 76 is greater than the highest value the minimum operating S.O.C. can be moved to in a fault condition—this was described in conjunction with FIG. 4 above. If the answer is "no", the minimum operating S.O.C. is set to the lowest S.O.C. that can still provide the minimum required discharge power; this is shown at step 80. If, however, the S.O.C. determined in step 76 is greater than the highest value that it can be moved to, then the minimum operating S.O.C. is set to the highest allowed value—see step 82.

Figure 7:
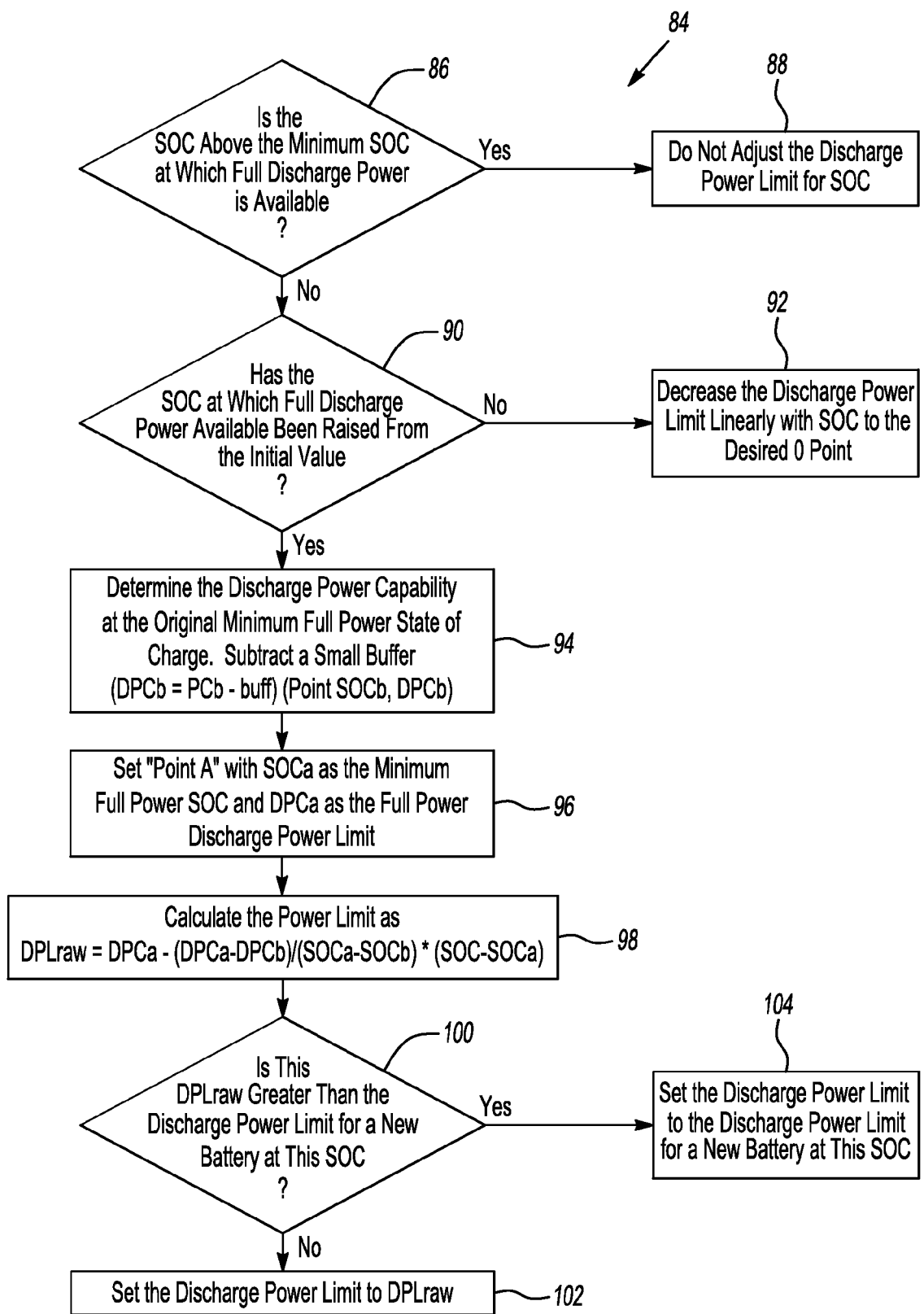
FIG. 7 is a flow chart illustrating a method of managing a discharge power limit for a battery in accordance with an embodiment of the present invention.

As discussed above in conjunction with FIG. 3, embodiments of the present invention also provide for setting a discharge (or charge) power limit curve that more closely follows the battery capability curve; one such method is described in the flow chart 84 shown in FIG. 7. At step 86 it is determined whether the current S.O.C. for the battery is above the minimum S.O.C. at which full discharge power is available. Using FIG. 2 for an example, the inquiry at step 86 is whether the current S.O.C. for the battery is above approximately 44%. If it is, there is no need to adjust the discharge power limits, and this is illustrated at step 88. If, however, the current S.O.C. is below this level, the method moves to step 90.

At step 90 a determination is made as to whether the S.O.C. at which full discharge power is available has been raised from its initial value. Turning to FIG. 3 to further the example, the answer to the inquiry at step 90 is "yes". Point A, corresponding to an S.O.C. of approximately 40%, has been raised from the initial minimum operating S.O.C. of 36%. If this were not the case, the method would move to step 92, where the discharge power limit would be reduced linearly with the S.O.C. to some desired zero point. This is illustrated in FIG. 3 by the curve 26', where Point B was not raised from the initial minimum operating S.O.C. of 36%, and the discharge power limit is reduced from approximately 26 kW, at an S.O.C. of 36%, to zero at an S.O.C. of approximately 28%.

In the example shown in FIG. 3, however, the answer to the inquiry in step 90 is "yes"; therefore, the method moves to step 94. At step 94, the point B is defined. At step 96, point A is defined, and a power limit curve is calculated by determining point C at step 98. At step 100, the inquiry is made as to whether the point determined at step 98 is greater than the discharge power limit for a new battery at the same S.O.C. If the answer is "no", the method moves to step 102, where the discharge power limit is set at Point C. If, however, the answer to the inquiry at step 100 is "yes", the method moves to step 104 where the discharge power limit is set to what the discharge power limit is for a new battery at that S.O.C.

Figure 6:
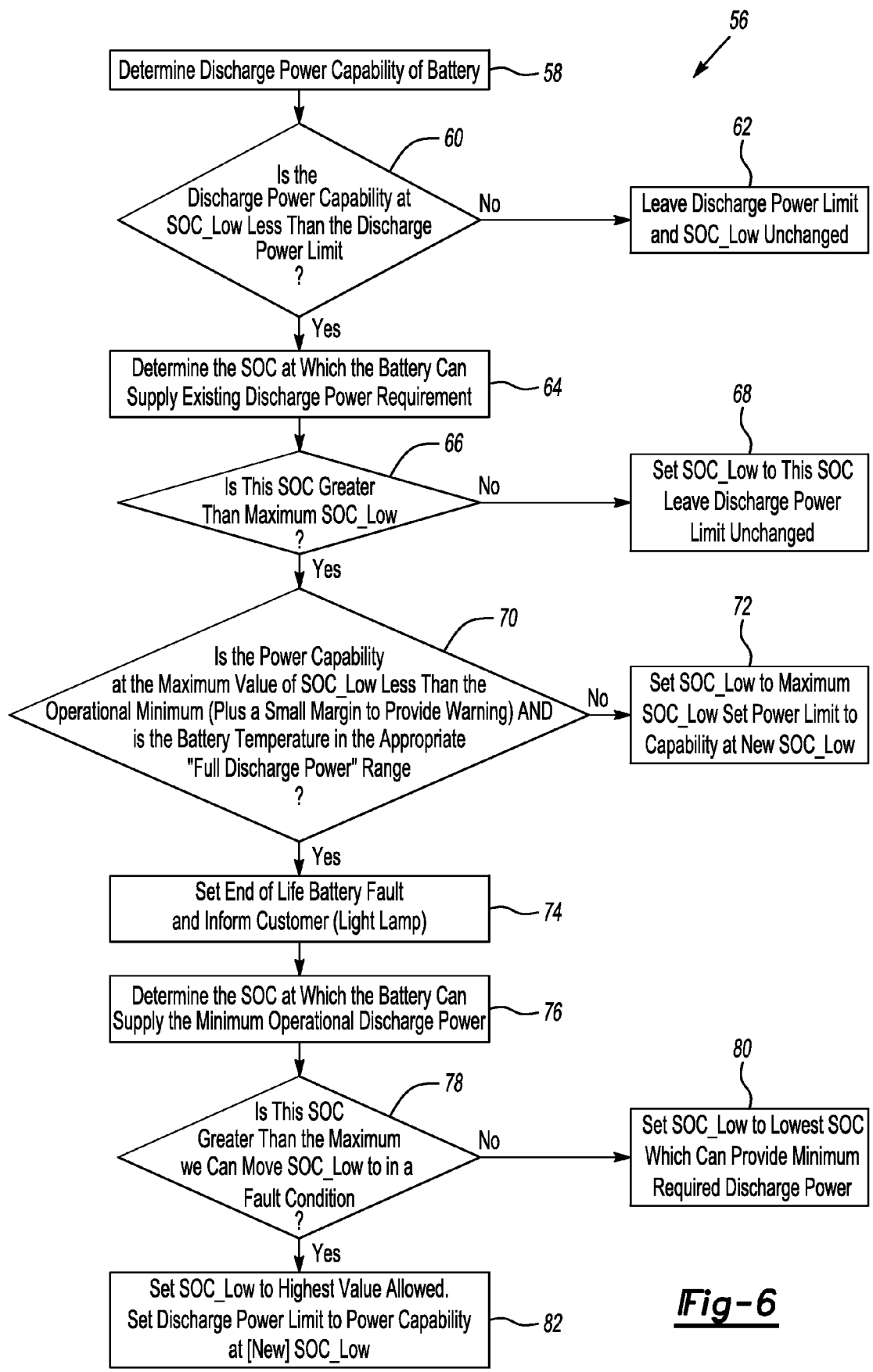
FIG. 6 is a flow chart illustrating a method of managing a discharge power limit for a battery in accordance with an embodiment of the present invention.
Figure 8:
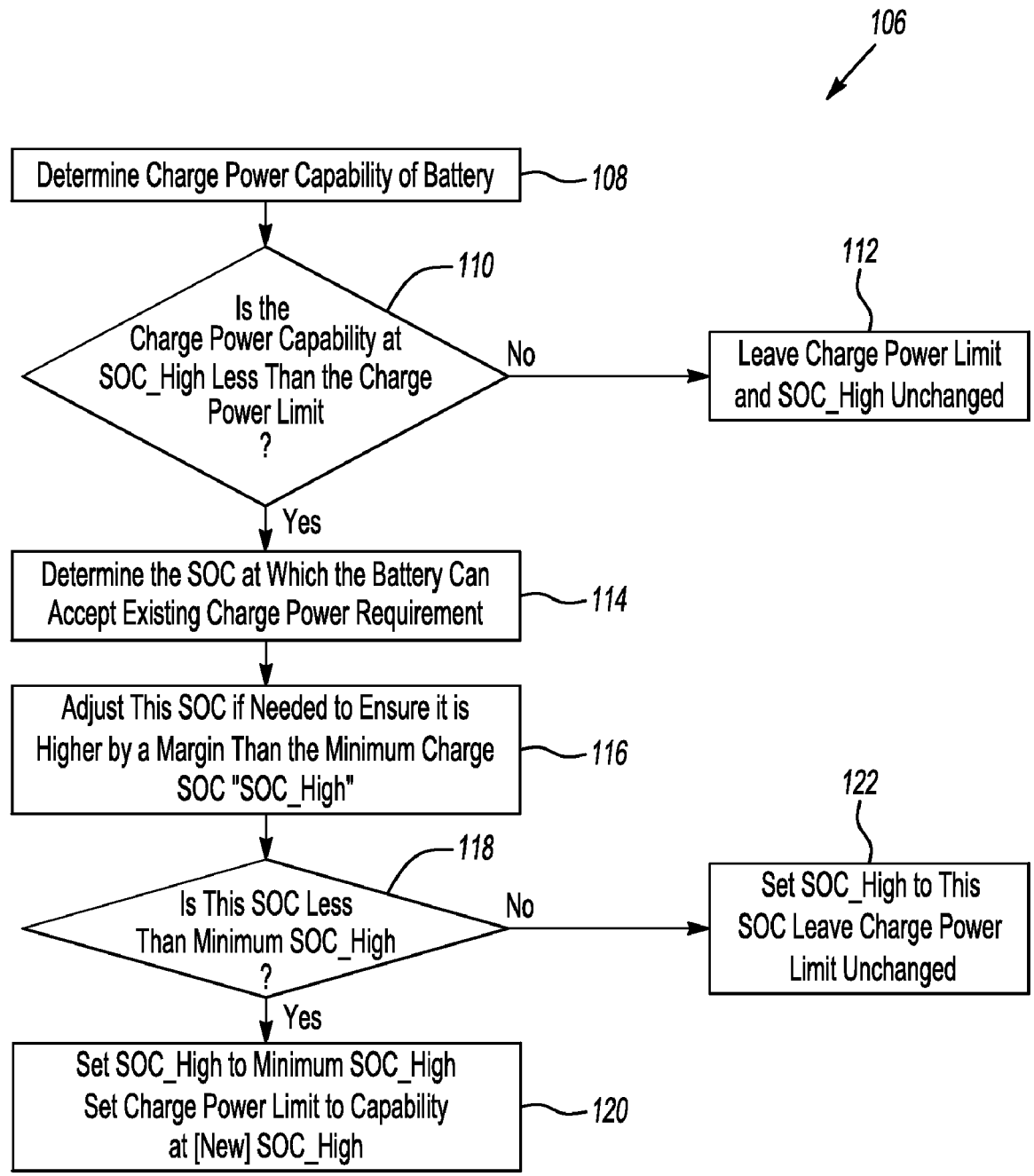
FIG. 8 is a flow chart illustrating a method of managing charge power limits for a battery in accordance with an embodiment of the present invention.

Turning to FIG. 8, the flow chart 106 shows a method analogous to the one illustrated in FIG. 6; however, the flow chart 106 shows a method of the present invention as applied to the charge power limit of a battery. At step 108 the power capability for the battery is determined; this is illustrated, for example, by the curve 48 in FIG. 5. At step 110 it is determined whether the power capability at the maximum operating S.O.C. (64% in the example shown in FIG. 5) is less than the charge power limit (curve 50 in the example shown in FIG. 5). If the answer is "no", the method moves to step 112 and the charge power limit is left unchanged. If, however, the answer to the inquiry at step 110 is "yes" then the method moves to step 114.

At step 114 a determination is made as to the S.O.C. where full charge power is available. Using the example in FIG. 5, this S.O.C. is approximately 57%. As shown at step 116, this S.O.C. may need to be adjusted if it is higher than a maximum low limit S.O.C.; this inquiry is made at step 118. In the example shown in FIG. 5, the answer to this inquiry was "yes", in that the maximum low limit S.O.C. was 60%. In this case, the method moves to step 120 where the maximum operating S.O.C. is set to the maximum low limit S.O.C. If the answer to the inquiry in step 118 had been "no", the method would have moved to step 122 where the maximum operating S.O.C. would have been set to the S.O.C. determined in step 114.

Figure 9:
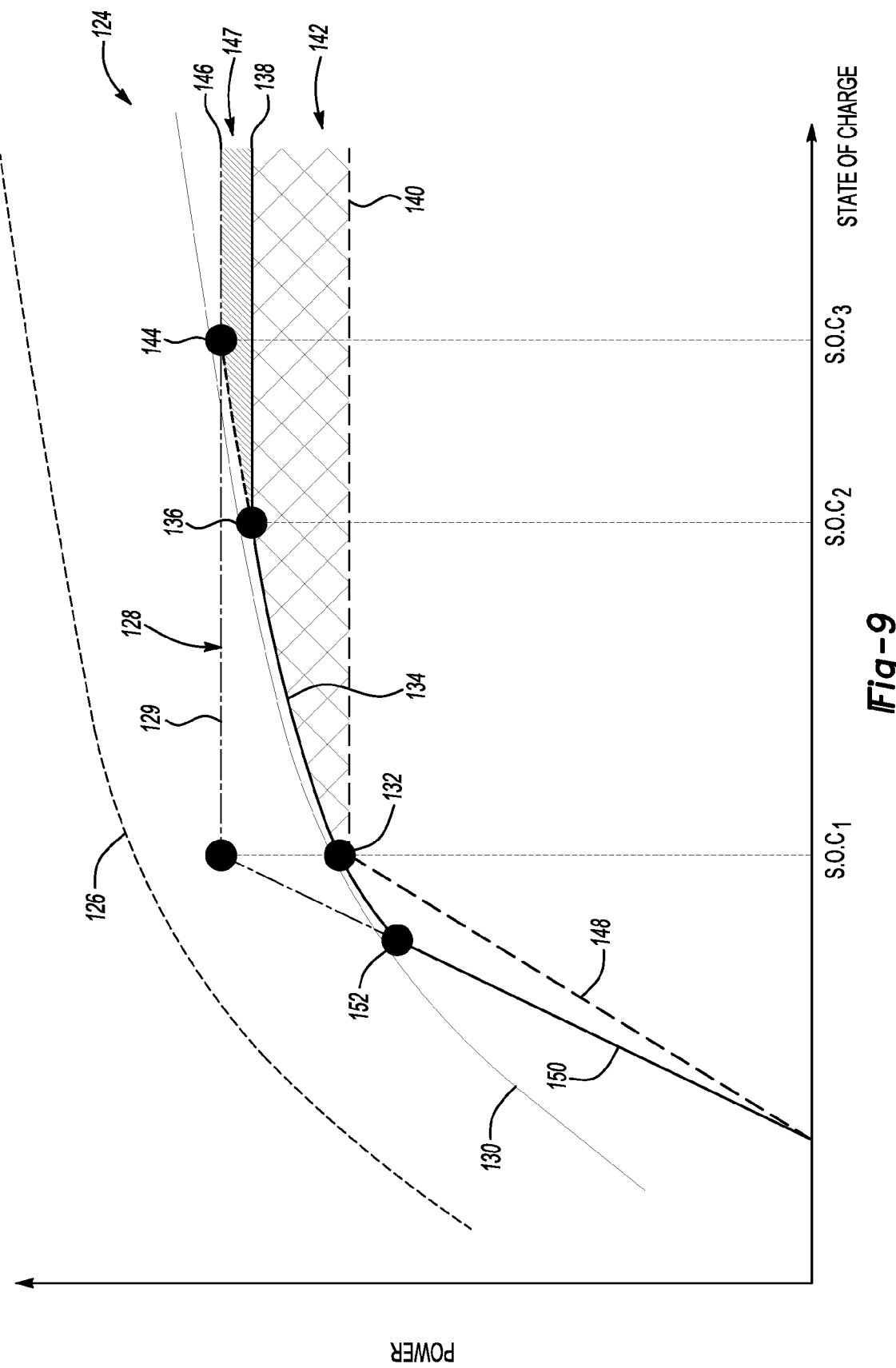
FIG. 9 is a graph showing a battery discharge power limit managed in accordance with an embodiment of the present invention.

FIG. 9 shows a graph 124 showing management of a battery discharge power limit in accordance with an embodiment of the present invention. Specifically, the curve 126 shows the power capability of a new battery, while the curve 128 shows the initial power discharge limit curve set when the power capability was in accordance with the curve 126. The full discharge power 129 is indicated by the horizontal portion of the curve 128, which is reduced to zero starting at some initial minimum operating S.O.C. indicated by $S.O.C._{-1}$. After some period of operating time, the power capability of the battery is reduced, as indicated by the curve 130. At this point it is clear that the full discharge power is not available at the initial minimum operating S.O.C.—i.e., at $S.O.C._{-1}$ the power capability curve 130 is below the power discharge curve 128. To adjust for this change in power capability, embodiments of the present invention may use the following method.

Initially, the power discharge limit is reduced from its initial level defined by the curve 128. This reduction can take place at a first predetermined point, such as the initial minimum operating S.O.C. ($S.O.C._{-1}$). As a starting point, the discharge power limit curve may be reduced to a point 132 just below the present power capability curve 130. The point 132 may be set at some predetermined distance below the curve 130, which may include a built-in buffer to account for inaccuracies in determining the current power capability. The reduced discharge power limit may now be partially defined by a first portion 134 that contains the first point 132 and is generally parallel to the power capability curve 130.

A second portion of the reduced discharge power limit curve can then be defined, and will generally be horizontal, indicating a constant discharge power limit over this portion. The starting point for the second portion of the reduced discharge power limit curve can be indicated by a present S.O.C., shown in FIG. 9 as $S.O.C._{-2}$, and indicated by the point 136. As shown in FIG. 9, beginning the second portion 138 of the reduced discharge power limit curve at the present S.O.C. may still provide a maximum discharge power limit that is less than the initial full discharge power limit 129, but has advantages over previous power management methods. For example, in previous power management methods the discharge power curve may be indicated by the horizontal line 140, which merely reduced the initial full discharge power 129 to a point below the reduced power capability 130. The gain in available power achieved by the present invention as described above, is indicated by the shaded region 142.

Another way to determine the second portion of the reduced power discharge curve, is to allow the first portion 134 of the reduced power discharge limit curve to continue parallel to the reduced power capability curve 130 until it reaches a point of intersection with the initial power discharge limit curve 129—this is indicated by point 144, corresponding to S.O.C.₃ in FIG. 9. Using this method, the full discharge power 129 is again available to the vehicle operator although a reduction in available power occurs at an earlier S.O.C.—that is, it begins to reduce at S.O.C.₃ rather than S.O.C.₂. Using this method, the second portion of the reduced power discharge limit curve is indicated by the horizontal line 146, which is that portion of the initial power discharge limit curve 128 that is above the point 144 corresponding to S.O.C.₃. This results in an additional gain of available power, indicated by the shaded region 147.

In addition to the first and second portions 134, 138 (or 146), the reduced power discharge limit curve may also include a third portion having an S.O.C. range that is below the first and second portions. As indicated by the sloped line 148, a prior method of reducing the power discharge limit curve may have started at the point 132 and reduced the curve to zero at the same point that the initial discharge power limit curve 128 reached zero. Applying a method of the present invention, a third portion 150 of the reduced discharge power limit curve is coincident with the initial discharge power limit curve 128 below the point of intersection of the first portion 134 of the reduced discharge power limit curve and the initial discharge power limit curve 128—this point is indicated at 152.

Thus, in at least some embodiments, the reduced discharge power limit curve intersects the initial discharge power limit curve 128 in two places at points 144, 152, where point 144 is the intersection point above the initial minimum operating S.O.C. (S.O.C.₁), and the point 152 is the intersection of the curves below S.O.C.₁. In general, the reduced discharge power limit curve may be defined by three portions, a first portion 134 having an S.O.C. range below a second portion 138 (or 146), and a third portion 150 having an S.O.C. range below both the first and second portions. By keeping at least the first portion 134 of the reduced discharge power limit curve generally parallel to the power capability 130, greater power is available to the vehicle operator than might otherwise be available through other methods of battery power management. The method described above in accordance with FIG. 9 can be applied to the charge limit as well as the discharge limit. Moreover, an end of life strategy, such as described above with reference to FIG. 4, can also be applied to a power management method described and illustrated in FIG. 9.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method for managing power limits for a battery having a power capability that is a function of at least a state of charge (S.O.C.) of the battery, the battery further having an operating S.O.C. range defined by a minimum operating S.O.C. and a maximum operating S.O.C., and a discharge power limit that is a function of at least the S.O.C., an initial discharge power limit being set below an initial power capability such that a predefined full discharge power is available at states of charge above an initial minimum operating S.O.C., the method comprising:

determining whether the full discharge power is available at the initial minimum operating S.O.C. after the initial power capability has decreased;

determining a new S.O.C. at which the battery can supply the full discharge power when it is determined that the full discharge power is not available at the initial minimum operating S.O.C.;

determining whether the new S.O.C. is greater than a maximum low limit S.O.C.; and setting the minimum operating S.O.C. to the new S.O.C. if it is determined that the new S.O.C. is not greater than the maximum low limit S.O.C.

2. The method of claim 1, further comprising:

determining whether the power capability at the maximum low limit S.O.C. is less than a predetermined power capability; and setting the minimum operating S.O.C. to the maximum low limit S.O.C. if it is determined that the new S.O.C. is greater than the maximum low limit S.O.C. and the power capability at the maximum low limit S.O.C. is not less than the predetermined power capability.

3. The method of claim 2, wherein the predetermined power capability is equal to an operational minimum power capability plus a predetermined amount.

4. The method of claim 1, further comprising:

determining whether a temperature of the battery is within a predetermined temperature range; and setting the minimum operating S.O.C. to the maximum low limit S.O.C. if it is determined that the new S.O.C. is greater than the maximum low limit S.O.C. and the temperature of the battery is not within the predetermined range.

5. The method of claim 4, further comprising:

indicating an end of life for the battery if it is determined that the new S.O.C. is greater than the maximum low limit S.O.C., the power capability at the maximum low limit S.O.C. is less than the predetermined power capability, and the temperature of the battery is within the predetermined temperature range.

6. The method of claim 5, further comprising:

defining a default condition maximum low limit S.O.C. as the maximum low limit S.O.C. allowed during a fault condition of the battery;

defining an absolute maximum low limit S.O.C. as the S.O.C. at which the battery can supply a minimum operational discharge power; and setting the maximum low limit S.O.C. to the absolute maximum low limit S.O.C. if the absolute maximum low limit S.O.C. is not greater than the default condition maximum low limit S.O.C.

7. The method of claim 6, further comprising setting the maximum low limit S.O.C. to the default condition maximum low limit S.O.C. if the absolute maximum low limit S.O.C. is greater than the default condition maximum low limit S.O.C.

8. The method of claim 1, further comprising:

defining a first point as the discharge power limit at the minimum operating S.O.C.;

defining a second point at the initial minimum operating S.O.C. to be below the power capability by a predetermined amount; and defining a first portion of a discharge power limit curve by the line connecting the first point and the second point.

9. The method of claim 8, further comprising:

defining a second portion of the discharge power limit curve by a line containing the second point and having a slope that generally matches the slope of a curve defining the power capability.

10. The method of claim 1, the battery further having a charge power limit that is a function of at least the S.O.C., an initial charge power limit being set below an initial power capability such that a predefined full charge power is available at states of charge below an initial maximum operating S.O.C., the method further comprising:

determining whether the full charge power is available at the initial maximum operating S.O.C. after the initial power capability has decreased;

determining a reduced S.O.C. at which the battery can accept the full charge power when it is determined that the full charge power is not available at the initial maximum operating S.O.C.;

determining whether the reduced S.O.C. is greater than a minimum high limit S.O.C.; and setting the maximum operating S.O.C. to the reduced S.O.C. if it is determined that the reduced S.O.C. is greater than the minimum high limit S.O.C.

11. The method of claim 10, further comprising setting the maximum operating S.O.C. to the minimum high limit S.O.C. if it is determined that the reduced S.O.C. is less than the minimum high limit S.O.C.

12. A method for managing power limits for a battery, comprising:

increasing a minimum operating state of charge (S.O.C.) after an initial power capability has decreased such that a predefined full discharge power is not available at an initial minimum operating S.O.C., the increased minimum operating S.O.C. being chosen such that the full discharge power is available if the increased minimum S.O.C. is not greater than a maximum low limit S.O.C.

13. The method of claim 12, wherein the increased minimum operating S.O.C. is set to the maximum low limit S.O.C. if the S.O.C. where full discharge power is available is greater than the maximum low limit S.O.C. and a power capability at the maximum low limit S.O.C. is not less than a predetermined power capability.

14. The method of claim 13, wherein the predetermined power capability is equal to an operational minimum power capability plus a predetermined amount.

15. The method of claim 12, further comprising:

setting the increased minimum operating S.O.C. to the maximum low limit S.O.C. if the S.O.C. where full discharge power is available is greater than the maximum low limit S.O.C. and a temperature of the battery is not within a predetermined range.

16. The method of claim 15, further comprising:

indicating an end of life for the battery if the S.O.C. where full discharge power is available is greater than the maximum low limit S.O.C., the power capability at the maximum low limit S.O.C. is less than a predetermined power capability, and the temperature of the battery is within the predetermined temperature range.

17. The method of claim 16, further comprising:

defining a default condition maximum low limit S.O.C. as the maximum low limit S.O.C. allowed during a fault condition of the battery;

defining an absolute maximum low limit S.O.C. as the S.O.C. at which the battery can supply a minimum operational discharge power; and setting the maximum low limit S.O.C. to the absolute maximum low limit S.O.C. if the absolute maximum low limit S.O.C. is not greater than the default condition maximum low limit S.O.C.

18. A method for managing power limits for a battery, comprising:

reducing a maximum operating state of charge (S.O.C.) after an initial power capability has decreased such that a predefined full charge power is not available at an initial maximum operating S.O.C., the reduced maximum operating S.O.C. being chosen such that the full charge power is available if the reduced maximum S.O.C. is not less than a minimum high limit S.O.C.

19. The method of claim 18, further comprising setting the reduced maximum operating S.O.C. to the minimum high limit S.O.C. if it is determined that the reduced maximum operating S.O.C. is less than the minimum high limit S.O.C.

* * * * *